United States Patent
Yorke et al.

(10) Patent No.: US 7,366,738 B2
(45) Date of Patent: Apr. 29, 2008

(54) METHOD AND SYSTEM FOR OBJECT CACHE SYNCHRONIZATION

(75) Inventors: Gordon James Yorke, Ottawa (CA); Michael Laurence Keith, Kanata (CA)

(73) Assignee: Oracle International Corporation, Redwood Shores, CA (US)

( * ) Notice: Subject to any disclaimer, the term of this patent is extended or adjusted under 35 U.S.C. 154(b) by 562 days.

(21) Appl. No.: 09/920,788

(22) Filed: Aug. 1, 2001

(65) Prior Publication Data

US 2003/0028683 A1  Feb. 6, 2003

(51) Int. Cl.
*G06F 12/00* (2006.01)
*G06F 17/30* (2006.01)
*G06F 9/44* (2006.01)

(52) U.S. Cl. ...................... 707/201; 718/101
(58) Field of Classification Search ............ 707/1–10, 707/201; 719/315–316, 310; 709/204, 205; 718/1, 100–108
See application file for complete search history.

(56) References Cited

U.S. PATENT DOCUMENTS

| | | | |
|---|---|---|---|
| 5,408,470 A * | 4/1995 | Rothrock et al. ........... 370/261 |
| 5,499,371 A | 3/1996 | Henninger et al. ......... 395/700 |
| 5,615,362 A | 3/1997 | Jensen et al. ............... 395/614 |
| 5,625,818 A * | 4/1997 | Zarmer et al. ............ 707/104.1 |
| 5,684,984 A * | 11/1997 | Jones et al. ................... 707/10 |
| 5,706,506 A | 1/1998 | Jensen et al. ............... 395/614 |
| 5,758,150 A * | 5/1998 | Bell et al. ..................... 707/10 |
| 5,870,759 A * | 2/1999 | Bauer et al. ................ 707/201 |
| 5,870,765 A * | 2/1999 | Bauer et al. ................ 707/203 |
| 5,926,816 A * | 7/1999 | Bauer et al. .................... 707/8 |
| 6,052,735 A * | 4/2000 | Ulrich et al. ............... 709/236 |
| 6,073,141 A * | 6/2000 | Salazar ....................... 707/204 |
| 6,078,926 A | 6/2000 | Jensen et al. ............... 707/103 |
| 6,125,369 A * | 9/2000 | Wu et al. .................... 707/201 |
| 6,128,661 A * | 10/2000 | Flanagin et al. ............ 709/227 |
| 6,226,650 B1 * | 5/2001 | Mahajan et al. ............ 707/201 |
| 6,272,545 B1 * | 8/2001 | Flanagin et al. ............ 709/228 |
| 6,289,357 B1 * | 9/2001 | Parker ........................ 707/202 |
| 6,324,544 B1 * | 11/2001 | Alam et al. ................. 707/201 |
| 6,324,587 B1 * | 11/2001 | Trenbeath et al. .......... 719/310 |
| 6,430,576 B1 * | 8/2002 | Gates et al. ................ 707/201 |
| 6,442,570 B1 * | 8/2002 | Wu .............................. 707/201 |
| 6,490,596 B1 * | 12/2002 | Micka ......................... 707/203 |
| 6,513,056 B1 * | 1/2003 | Copeland et al. ........... 718/101 |
| 6,539,381 B1 * | 3/2003 | Prasad et al. ................. 707/10 |
| 6,633,924 B1 * | 10/2003 | Wu et al. .................... 719/328 |
| RE38,457 E * | 3/2004 | Rothrock et al. ........... 370/261 |
| 6,792,436 B1 * | 9/2004 | Zhu et al. ................... 707/203 |
| 6,892,210 B1 * | 5/2005 | Erickson et al. ............ 707/201 |
| 6,910,052 B2 * | 6/2005 | Gates et al. ................ 707/201 |

OTHER PUBLICATIONS

U.S. Appl. No. 60/259,425, filed Dec. 29, 2000.*

* cited by examiner

*Primary Examiner*—Lewis A. Bullock, Jr.
(74) *Attorney, Agent, or Firm*—Park, Vaughan & Fleming LLP (57) ABSTRACT

A system and method are provided for providing object change information through a network. The local object persistence system distributes the information regarding the change to the object by the synchronization executor through a communication link. The remote object persistence system that has established the communication link with the local object persistence system obtains the distributed object change information. The object change information is used to update the database and update an object cache for storing the object.

12 Claims, 10 Drawing Sheets

METHOD AND SYSTEM FOR OBJECT CACHE SYNCHRONIZATION

This invention relates to the field of databases and, more specifically, to a system and method for managing object caches that maintain objects read from databases.

BACKGROUND OF THE INVENTION

Object model technology is becoming more popular for building enterprise applications and it is desirable to allow object applications to obtain and manipulate objects in databases where corporate and other data is typically stored. Accordingly, there is a need to efficiently acquire and store objects from a database, and an object caching mechanism is one solution to accomplish this. In this technique, an in-memory object cache may maintain the object read from the database. Then, if the same object is requested, the object is read from the in-memory cache instead of the database. In this manner, objects are acquired more efficiently.

However, if several database clients or several application servers have an in-memory object cache, the in-memory object caches may fall out of synchronization with each other and with the database. This can lead to the increased probability of stale data and potential data corruption.

Refreshing the in-memory cache on a query-by-query basis is one solution to this problem. However, in this approach, every query against the cache must access the database and refresh the cached instances with the database data. By accessing the database in this manner, the efficiency of caching is reduced.

It is therefore desirable to provide a method and system that allow a synchronization of objects caches.

SUMMARY OF THE INVENTION

It is an object of the present invention to overcome one or more of the problems cited above.

It is an object of the invention to provide a system and method for providing information respecting a change in an object to another system that maintains the object in the object cache.

The present invention distributes the change information through the network. To distribute the change information, it uses the communication link with another system.

In accordance with an aspect of the present invention, there is provided a method for providing object change information from a first system to a second system which has an object cache for storing objects for synchronizing the second system with the first system. The method comprises the steps of changing an object in the first system, determining object change information representing change made to the object in the first system, and distributing the object change information from the first system to the second system to cause the second system to merge the object change information into the object cache so as to synchronize the second system with the first system.

In accordance with another aspect of the present invention, there is provided a method for providing object change information from a first system to a second system for synchronizing the second system with the first system. The first system has a first object cache for storing one ore more objects. The second system has a second object cache for storing one ore more objects. The method comprises the steps of determining object change information representing a change made to an object in the first system, and distributing the object change information from the first system to the second system to cause the second system to merge the object change information into the second object cache so as to synchronize the object in the second object cache with the changed object in the first system.

In accordance with another aspect of the present invention, there is provided a synchronization executor for providing object change information from a first system to a second system for synchronizing the second system with the first system. The first system is capable of changing the object. The second system has an object cache for storing objects. The executor comprises a synchronization manager for obtaining object change information representing change made to an object in the first system, and a dispatcher for distributing the object change information from the first system to the second system to cause the second system to merge the object change information into the object cache so as to synchronize the object in the second system in the first system.

In accordance with another aspect of the present invention, there is provided a persistence system for synchronizing an object on a network that includes a caching a system having an object cache for storing objects. The system comprises a transaction manager for changing an object and determining object change information representing the change made to the object for updating a database, and a synchronization executor for obtaining the object change information from the transaction manager and distributing the object change information to the caching system to cause the caching system to merge the object change information into the object cache so as to synchronize the object in the object cache with the changed object in the persistence system.

Other aspects and features of the present invention will be readily apparent to those skilled in the art from a review of the following detailed description of the preferred embodiments in conjunction with the accompanying drawings.

BRIEF DESCRIPTION OF THE DRAWINGS

The invention will be further understood from the following description with reference to the drawings in which.

DETAILED DESCRIPTION OF THE PREFERRED EMBODIMENTS

Figure 1:
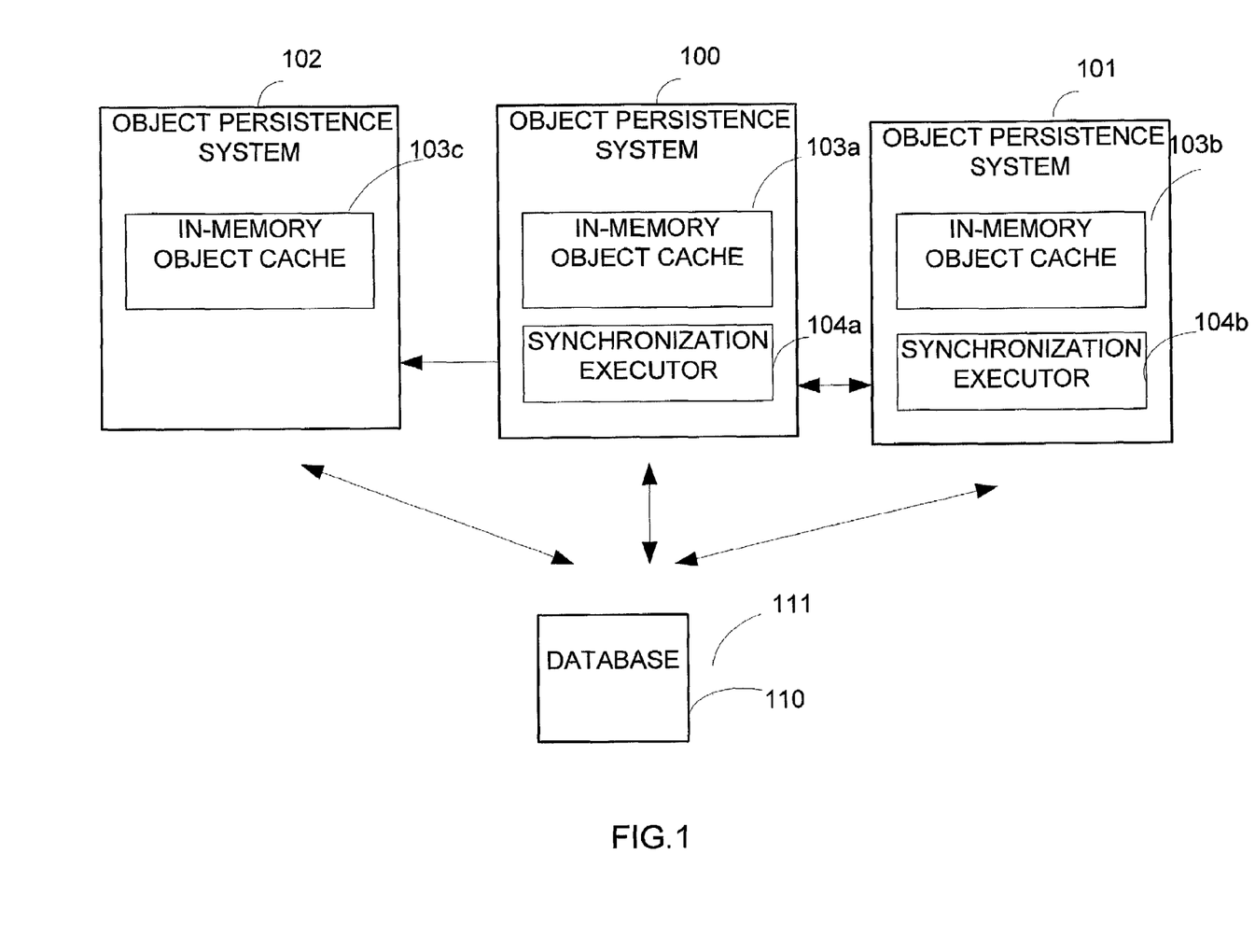
FIG. 1 is a block diagram showing a network to which a synchronization executor in accordance with one embodiment of the present invention is applied.

FIG. 1 shows an example of a network to which a synchronization executor 104*a* in accordance with one embodiment of the present invention is applied. A network shown FIG. 1 includes object persistence systems 100, 101 and 102. However, the network may include greater or fewer object persistence systems. Each object persistence system 100-102 manages one or more databases. In FIG. 1, one database sever 111 including one database 110 is shown. The object persistence systems 100-102 include in-memory object caches 103a, 103b, 103c, respectively. Each in-memory object cache 103a, 103b, 103c stores objects read from the database 110. Each in-memory object cache 103b, 103c may be similar to the in-memory object cache 103a.

For example, once the object persistence system 100 reads an object from the database 110, it may be saved in the in-memory object cache 103a. If the object is requested again in the object persistence system 100, the object persistence system 100 will read the object in the in-memory object cache 103a. This eliminates the need for a database call.

The object persistence system 100 further includes the synchronization executor 104a. The synchronization executor 104a distributes information of changes of the objects in the object persistence system 100 to one or more object persistence systems through a communication link as described below. The synchronization executor 104a receives information of changes of the objects from the other object persistence systems, such as the object persistence system 101.

The object persistence system 101 further includes a synchronization executor 104b. The synchronization executor 104b may be similar to the synchronization executor 104a.

The object persistence system 102 further includes a unit (now shown) for receiving distributed information of changes of the objects and does not include the synchronization executor 104a.

The object persistence systems 100-102 receive and merge the distributed information of changes of the objects into the in-memory object cache 103a-103c, respectively.

When an object persistence system distributes the information of changes of the objects, the object persistence system that distributes the information of changes of the objects is referred to as a local object persistence system.

When an object persistence system receives the information of changes of the objects, the object persistence system that receives the information of changes of the objects is referred to as a remote object persistence system, however, it is not necessary for the remote object persistence system to be remotely located from the local object persistence system.

The local object persistence system and the remote object persistence system are connected through a communication mechanism or system. The local and remote object persistence systems synchronize their in-memory object caches with each other through the communication link established by the communication mechanism or system. The communication mechanism or system is further described in more detail below.

In FIG. 1, the object persistence system 102 is shown separately from each object persistence system 100 or 101. However, it is not necessary for the object persistence system 102 to be remotely located from anther object persistence system.

In FIG. 1, the synchronization executor 104a is shown as a part of the object persistence system 100 and the synchronization executor 104b is shown as a part of the object persistence system 101. However, the synchronization executor 104a or 104b may be separately provided from the corresponding object persistence system.

Figure 2:
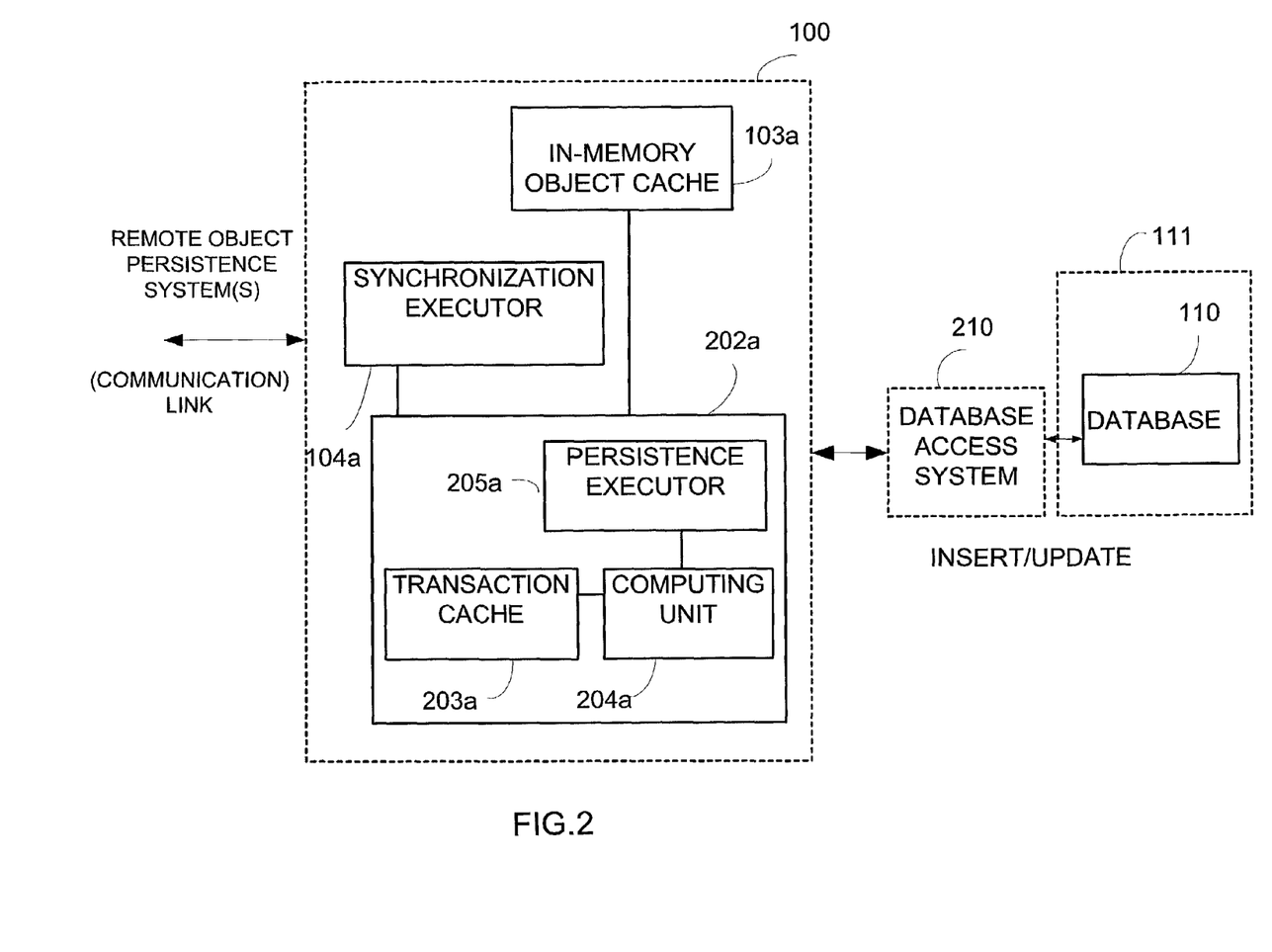
FIG. 2 is a block diagram showing an example of the object persistence system 100.

FIG. 2 shows an example of the components of the object persistence system 100. The object persistence system 100 includes the in-memory object cache 103a, a transaction manager 202a and the synchronization executor 104a.

The transaction manager 202a is a runtime component to manage transactions. A transaction is a set of database operations that can either be committed (accepted) or rolled back (undone). Objects in the database 110 may be changed through the transaction using the object persistence system 100 and a database access system 210. The database access system 210 is a programming interface that enables the object persistence system 100 to access the database server 111 having the database 110. The transaction manager 202a handles updates of the database 110. Unsuccessful transactions can be discarded, leaving the database in its original state.

The transaction manager 202a includes a transaction cache 203a, a computing unit 204a and a persistence executor 205a. The transaction cache 203a is a temporary cache for storing a set of changes of a set of objects. The computing unit 204a is a component for computing object change sets. The object change sets represent information of changes of the objects, such as the objects in the database 110. The persistence executor 205a merges the object change sets into the in-memory object cache 103a.

On a commit of the transaction, the computing unit 204a computes the object change sets based on the set of changes in the transaction cache 203a. The object change sets are translated into a database language and sent to the database access system 210. New objects are inserted, or changed objects are updated in the database 110.

In FIG. 2, the synchronization executor 104a is shown separately from the transaction manager 202a. However, the synchronization executor 104a may be combined with or made as component of the transaction manager 202a.

The object persistence system 101 includes a transaction manager 202b as shown below. The transaction manager 202b may be a similar to the transaction manager 202a.

Figure 3:
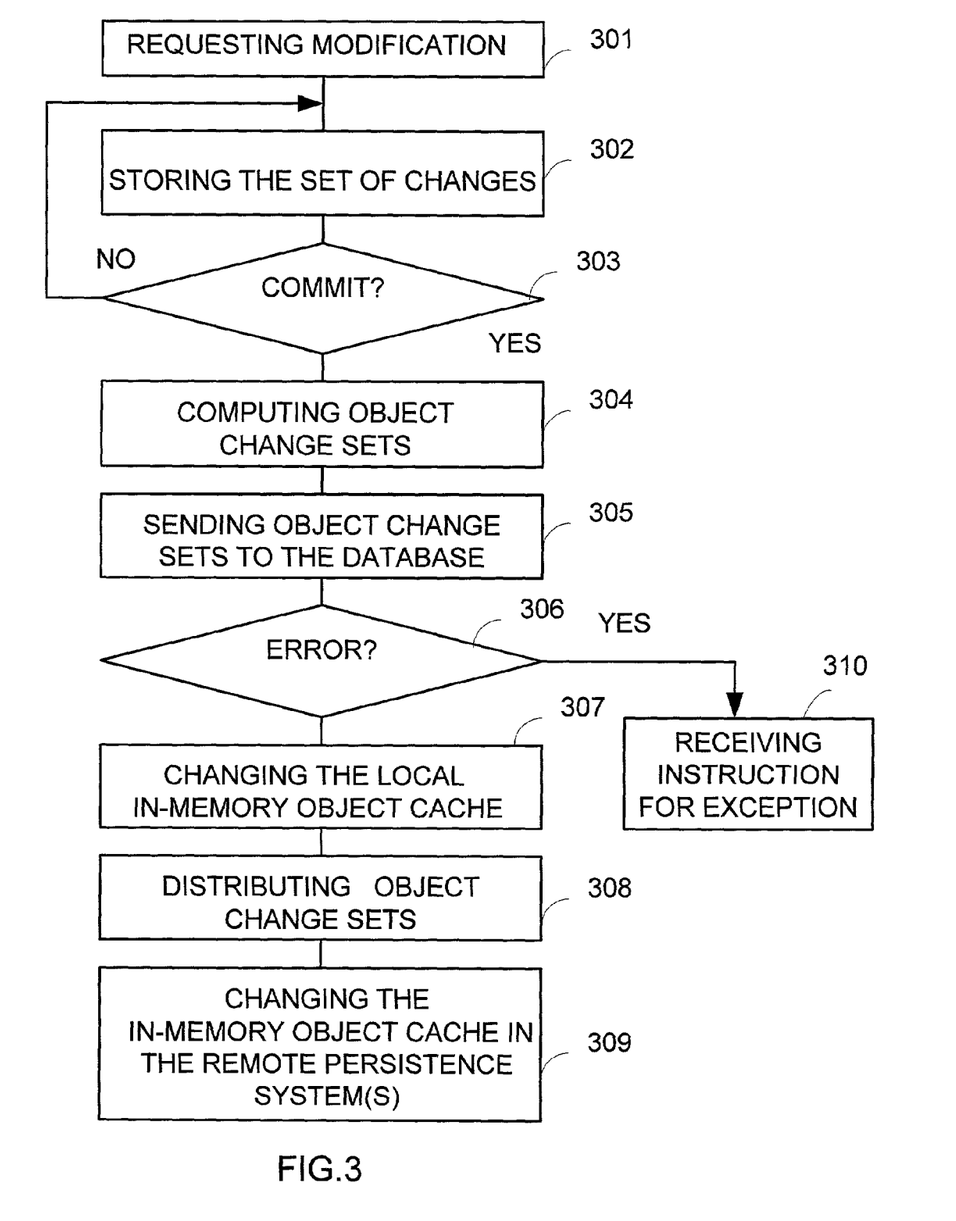
FIG. 3 is a flowchart showing a modification operation of the object persistence system.

FIG. 3 shows a flowchart showing a modification process of the local and remote object persistence systems . The object persistence system 100 is called a local object persistence system 100 and the object persistence system 101 is called a remote object persistence system 101.

In step 301, a modification request for modifying objects is sent to the local object persistence system 100. For example, an application may send the modification request to the object persistence system 100. The transaction manager 202a stores the set of changes to the objects in the transaction cache 203a during the transaction (step 302). When the transaction is committed (step 303), the computing unit 204a of the local object persistence system 100 computes the object change sets (step 304). In step 305, the object change sets are translated into a database language, such as Structured Query Language (SQL), and sent to the local database access system 210 to update the database 110.

If no database error occurs when updating the objects of the database (step 306), object change sets are committed to the local in-memory object cache 103a by the persistence executor 205a (step 307).

In order to synchronize the remote in-memory object cache, the synchronization executor 104a received the object change sets from the transaction manager 202a. The object change sets are distributed to one or more remote object persistence systems (step 308). The one or more remote persistence systems receive the object change sets and merge the object changes sets into their in-memory object caches (step 309).

In this case, the remote object persistence system 101 receives the object change sets from the local object persistence system 100 and the persistence executor included in the remote object persistence system 101 merges the object change sets into the in-memory object cache 103*b*.

If an error occurs when updating the database (step 306), an instruction for exception is returned to the local object persistence system (step 310). In this case, the local object persistence system 100 does not commit the modification of the local in-memory object cache 103*a*. Therefore, the local in-memory object cache 103*a* keeps its original state. Also, the object change sets will not be distributed to one or more remote object persistence systems, such as the remote object persistence system 101.

Referring back to FIG. 2, the computing unit 104*a* computes the object change sets for objects that changed. Preferably, the object change sets may include a minimal set of information regarding changes to the objects. The advantage of distributing a minimal set of information regarding changes is that less data will be required to be sent across the communication link from the local object persistence system to the remote object persistence system. In this embodiment, the computing unit 104*a* outputs the minimal object change sets as the object change sets.

Each object change set includes one or more changes to the attribute and/or data of the changed object. Each object change set further includes the unique identifier (referred to as a primary key value) to uniquely identify the changed object. There are two kinds of the object classes, first object classes and aggregate object classes. The first object classes have their own primary keys. Thus, each of the objects in the first object classes can be queried with its own primary key value. The aggregate object classes do not have their own primary keys. Thus, each of the objects in the aggregate object classes is a dependent (aggregated) part of its parent object.

Preferably, each object change set does not include any information as to attributes or data that did not change.

Some objects which reference to one or more objects are called source objects. The objects referenced by the source objects are called target objects. A source object and a target object may have a relationship. The relationships include a one-to-one relationship, a one-to-many relationship, and a many-to-many relationship.

For example, an object change set includes one or more of (1) the changed value of a direct attribute of the source object, (2) the primary key value of the source object, (3) the primary key value of the target object of changed one-to-one relationships, and (4) the primary key values of the target objects added and removed from one-to-many/many-to-many relationships.

A direct attribute is an attribute that is a simple data-type such as a number, string or data. The direct attribute does not include a relationship. When the source object is updated, the object change set may include the changed value of the direct attribute and the primary key value of the source object.

For a one-to-one relationship, where one object in one object class refers to a single object in a different object class, a reference may be changed from one target object to another target object. Thus, when the reference is changed in the one-to-one relationship, the new primary key value of the target object is included in the object change set of the source object.

For a one-to-many relationship, where one object in one object class refers to one or more objects in one or more object classes, the target objects may be added or removed.

Thus, when the object is added in the one-to-many relationship, the new primary value of the target object is included in the object change set of the source object.

For a many-to-many relationship, where a collection of objects in object classes refers to multiple objects in one or more object classes, the target objects may be added or removed. Thus, when the object is added in the many-to-many relationship, the new primary value of the target object is included in the object change set of the source object.

Consider two object classes, "Employee" and "Address". "Employee" and "Address" have a one-to-one relationship. "Employee" has attributes "employee ID" (primary key) and "address". "Address" has attributes "code", "street". The value of "address" references an Address object. When a new Employee object for a new employee E1 and the new Address object for E1 is inserted in a database, an object change set of the new employee E1 and an object change set of the new address A1 are prepared. The object change set of the new employee E1 includes a primary key value ("123"), the value of "employee ID" ("1234"), and the value of "address" (a primary key value of the target object="456") as shown below. The object change set of the new address A1 includes a primary key value ("456"), the value of "code" ("456") and the value of "street" ("elgin") as shown below.

(E1 change set
  PK(123)
  (employee ID=123)
  (address=PK(456)))

(A1 change set
  PK(456)
  (code=456)
  (street="elgin"))

Consider two object classes "Employee" and "Tel". "Employee" and "Tel" have a one-to-many relationship. "Employee" has attributes "employee ID" (primary key) and "telephones". "TEL" has attributes "telephone no". "Employee" object for Employee E1 has two Telephone numbers. When a new TEL object T1 for the existing Employee E1 is added and the TEL object T2 of the Employees E1 is removed in a database, an object change set of the employee E1 is prepared. The object change set of the employee E1 includes a primary key value ("123"), a primary key value of the added target object ("T1") and a primary key value of the removed target object ("T2") as shown below.

(E1 change set
  PK(l23)
  (telephones-added(PK(T1)–removed(PK(T2))))

Figure 4:
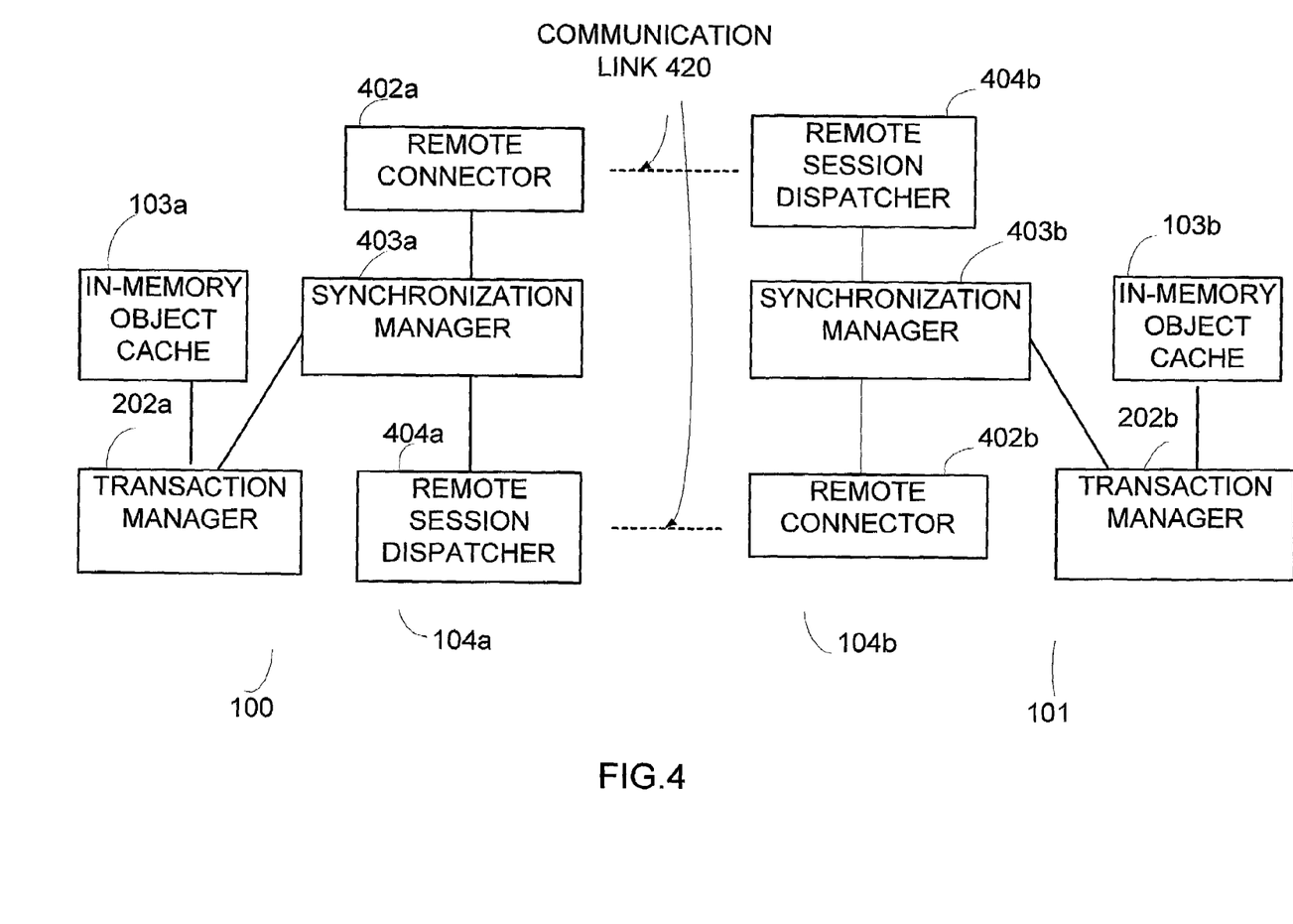
FIG. 4 is a block diagram showing a communication link for synchronization.

FIG. 4 shows an example of the synchronization executor 104*a* and 104*b*. The synchronization executor 104*a* includes a remote connector 402*a*, a synchronization manager 403*a* and a remote session dispatcher 404*a*. The synchronization manager 403*a* manages the remote connector 402*a* and the remote session dispatcher 404*a*. The synchronization executor 104*b* includes a remote connector 402*b*, a synchronization manager 403*b* and a remote session dispatcher 404*b*. The synchronization manager 403*b* manages the remote connector 402*b* and the remote session dispatcher 404*b*.

The remote connector 402*b*, the synchronization manager 403*b* and the remote session dispatcher 404*b* are similar to the remote connector 402*a*, the synchronization manager 403*a* and the remote session dispatcher 404*a*, respectively.

The remote connector 402*a* couples to the remote session dispatcher 404*b* via a communication link 420. The remote connector 402b couples to the remote session dispatcher 404a via the communication link 420.

For example, consider that the object persistence system 100 is the local object persistence system and the object persistence system 101 is the remote object persistence system.

In the local object persistence system 100, the persistence executor 205a (FIG. 2) merges the object change sets into the local in-memory object cache 103a. The transaction manager 202a sends the object change sets to the synchronization executor 104a. The object change sets will be distributed through the communication link 420 from the remote session dispatcher 404a of the local object persistence system 100 to the remote connector 402b of the remote object persistence system 101.

In the remote object persistence system 401, the synchronization manager 403b may send the received object change sets to the transaction manager 202b. The persistence executor of the remote object persistence system 101 may merge them into the remote in-memory object cache 103b.

Figure 5:
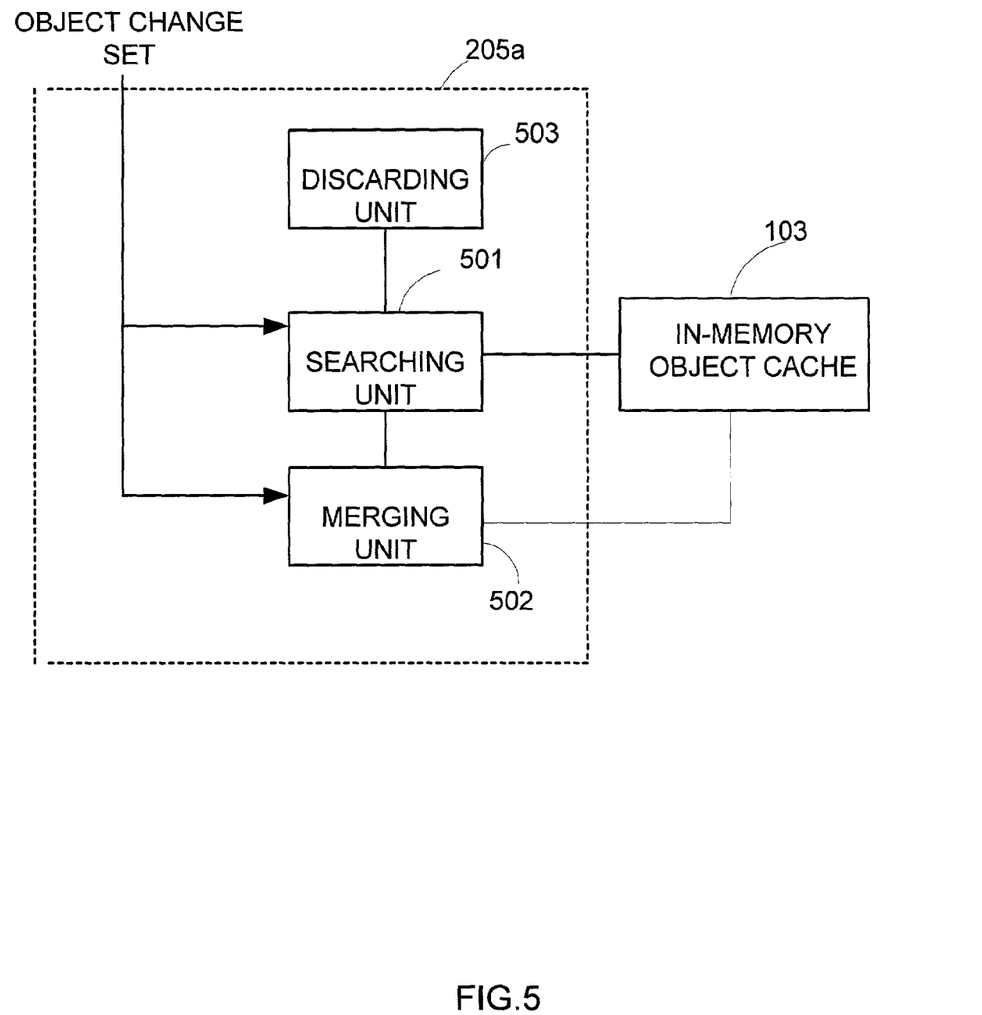
FIG. 5 is a block diagram showing an example of a persistence executor 205*a*.

FIG. 5 shows an example of the persistence executor 205a. The persistence executor 205a includes a searching unit 501, a merging unit 502 and a discarding unit 503.

The searching unit 501 looks up an object for each object change set by its primary key value. On the receipt of an object change set, the searching process of the searching unit 501 is executed. If the object is in the in-memory cache 103a, the merging unit 502 takes the object change set and applies the changes to the object in the in-memory object cache 103a. Otherwise, the discarding unit 503 discards the object change set.

For the direct attributes, the target object's attribute value is set to the new value. For one-to-one relationships, the new primary key value in the object change set of the source object is used to find the target object from the in-memory object cache 103a and set the attribute to the new object. If the target object is not found in the in-memory object cache 103a, the target object is found/queried from the database and cached in the in-memory object cache.

For one-to-many and many-to-many relationships, the one-to-many/many-to-many change record contains the added and removed objects. For each added object, the primary key value in the object change set of the source object is used to find the target object from the in-memory object cache and add the found object to the collection. For removed objects, the primary key value in the object change set of the source object is used to iterate over the target's collection and remove the object with matching primary key value.

This results in the object having the same state as the object to which the changes were originally made. This reduces the probability of stale data and potential data corruption. Therefore, the performance benefit of caching is achieved. Read operations using the in-memory object cache will be able to obtain a cache hit and avoid database access. This process, could add additional complexity to write operations, however, performance reduction related to such complexity is minimized by only distributing the minimal set of changes to the objects.

In order for a group of object persistence systems (residing on database clients or application servers as shown below) to synchronize their in-memory object caches with each other, they establish a communication link with each other. For example, a publish/subscribe protocol may be used.

When each object persistence system comes on-line, each object persistence system sends out its unique session identifier to the group of object persistence systems (i.e. online object persistence systems). Each object persistence system in the group that is on-line will receive the session identifier and then request synchronization with the object persistence system that sent the session identifier.

Figure 6:
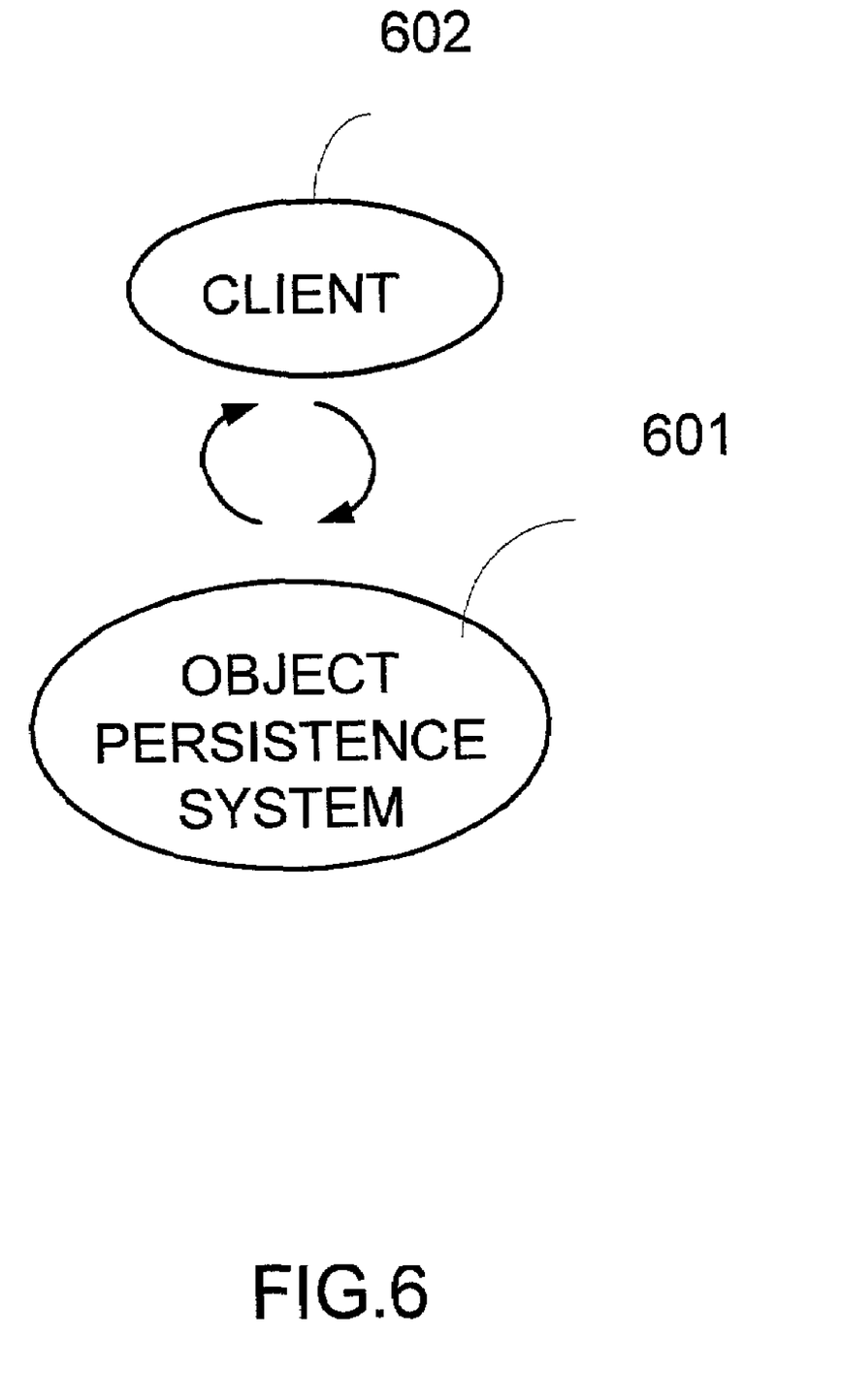
FIGS. 6-8 are pictorial diagrams illustrating a scenario showing the communication link.
Figure 7:
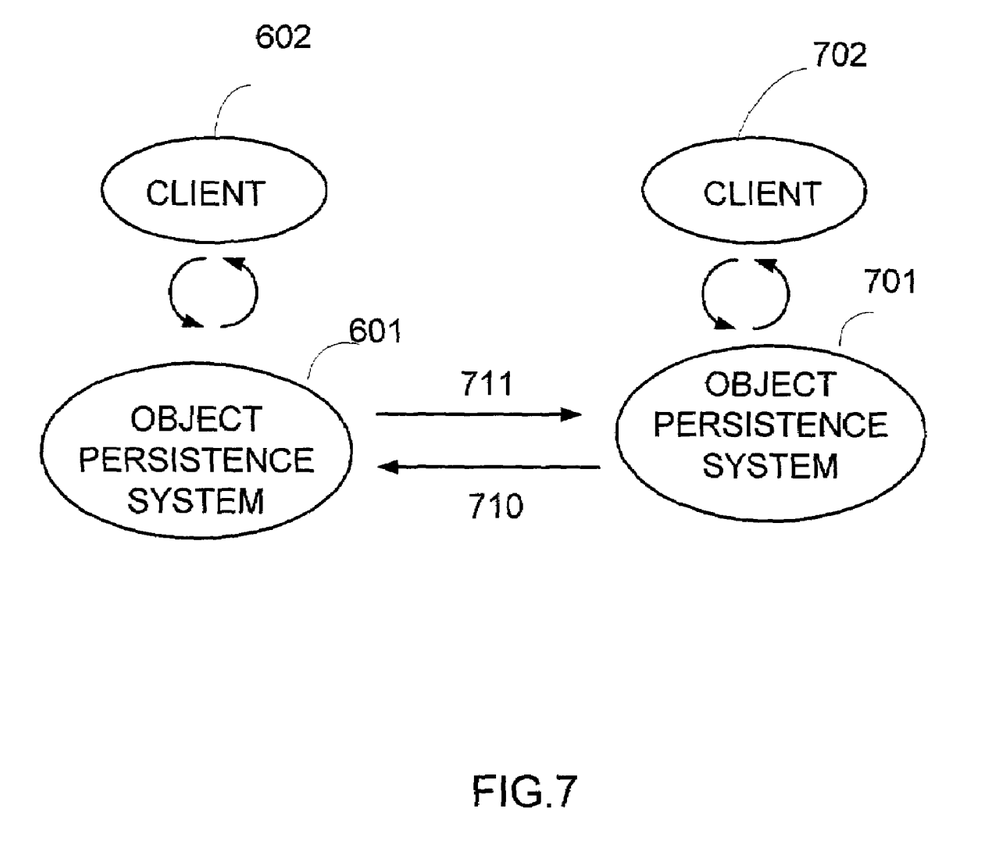
Figure 8:
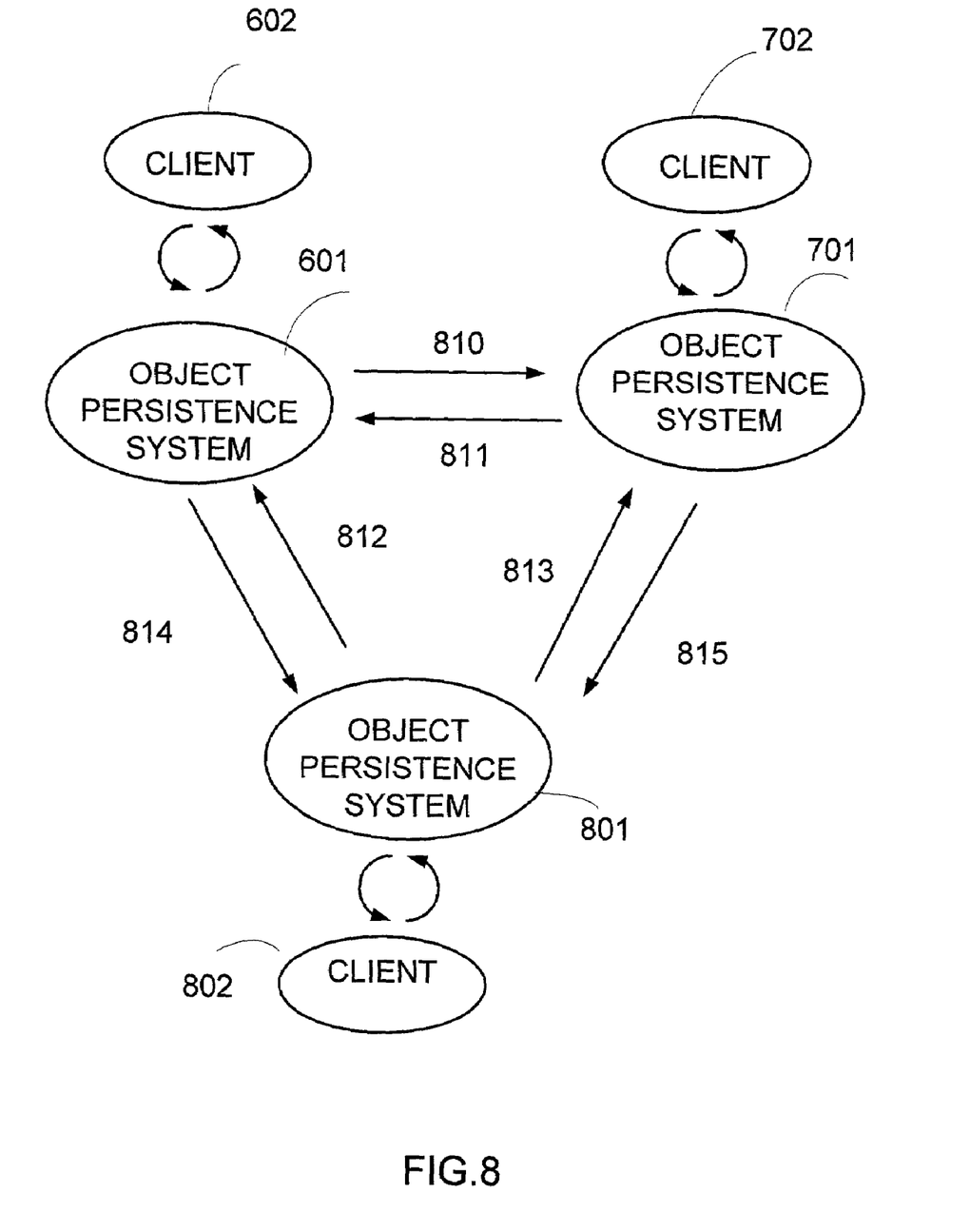

FIGS. 6-8 are pictorial diagrams illustrating a scenario showing the establishment of such a communication link. In FIGS. 6-8, each object persistence system 601, 701, 801 is similar to the object persistence system 100.

Referring to FIG. 6, there are an object persistence system 601 and a client 602. The client 602 may manage the database through the object persistence system 601.

Referring to FIG. 7, when an object persistence system 701 comes on-line, the object persistence system 701 sends out its unique session identifier to the object persistence system 601 (step 710). The object persistence system 601 receives the session identifier and then requests synchronization with the object persistence system 701 (step 711).

Referring to FIG. 8, the object persistence systems 601 and 701 communicate with each other (steps 810, 811). When an object persistence system 801 comes on-line, the object persistence system 801 sends out the unique session identifier to the object persistence systems 601, 701, respectively (steps 812, 813). The object persistence systems 601,701 receive the session identifier and then request synchronization with the object persistence system 801, respectively (steps 814, 815).

Likewise, when the object persistence system receives one or more requests from one or more object persistence systems (referred to as a requester), the object persistence system that receives the request will in turn send a request back to the requester. Through bi-directional requests, each object persistence system will know about all of the other object persistence systems in the group.

In FIG. 7, the object persistence system 701 sends out its unique identifier and the object persistence system 601 requests synchronization with the object persistence system 701. However, the object persistence system 601 may send out its unique identifier and the object persistence system 701 may request synchronization with the object persistence system 601.

In FIG. 8, the object persistence system 801 sends out their unique identifier and the object persistence systems 601, 701 request synchronization with the object persistence system 801. However, the object persistence systems 601, 701 may send out their unique identifiers and the object persistence system 801 may request synchronization with the object persistence systems 601, 701.

Each object persistence system 601,701,801 may have a synchronous mode and an asynchronous mode. In the synchronous mode, execution control of each local object persistence system is blocked and is not returned to the client of the object persistence system until changes have been processed by each remote object persistence system. In the asynchronous mode, the local object persistence system returns to the client and the changes are sent to the remote object persistence system in the background.

Execution control means the active thread/process in a multiple threaded system where the object persistence systems 601,701, and 801 are multiple thread systems. When execution control is blocked in a system, the other servers are synchronized either in a background thread or in the client's thread.

Referring to FIG. 8, consider that the object persistence systems 601, 701 and 801 have clients 602, 702 and 802, respectively. In the synchronous mode, execution control of the object persistence systems 601, 701 and 801 is blocked to the clients 602, 702 and 802 until the changes have been processed by each object persistence system. In the asynchronous mode, execution control of the object persistence systems 601, 701 and 801 is returned to the clients 602,702 and 802 and the changes of each object persistence system are sent to the remote object persistence systems in the group. This allows the object change sets of the local object persistence system to be distributed to the remote object persistence systems asynchronously to the client of the local object persistence system. Therefore, write performance is not affected by object cache synchronization.

Figure 9:
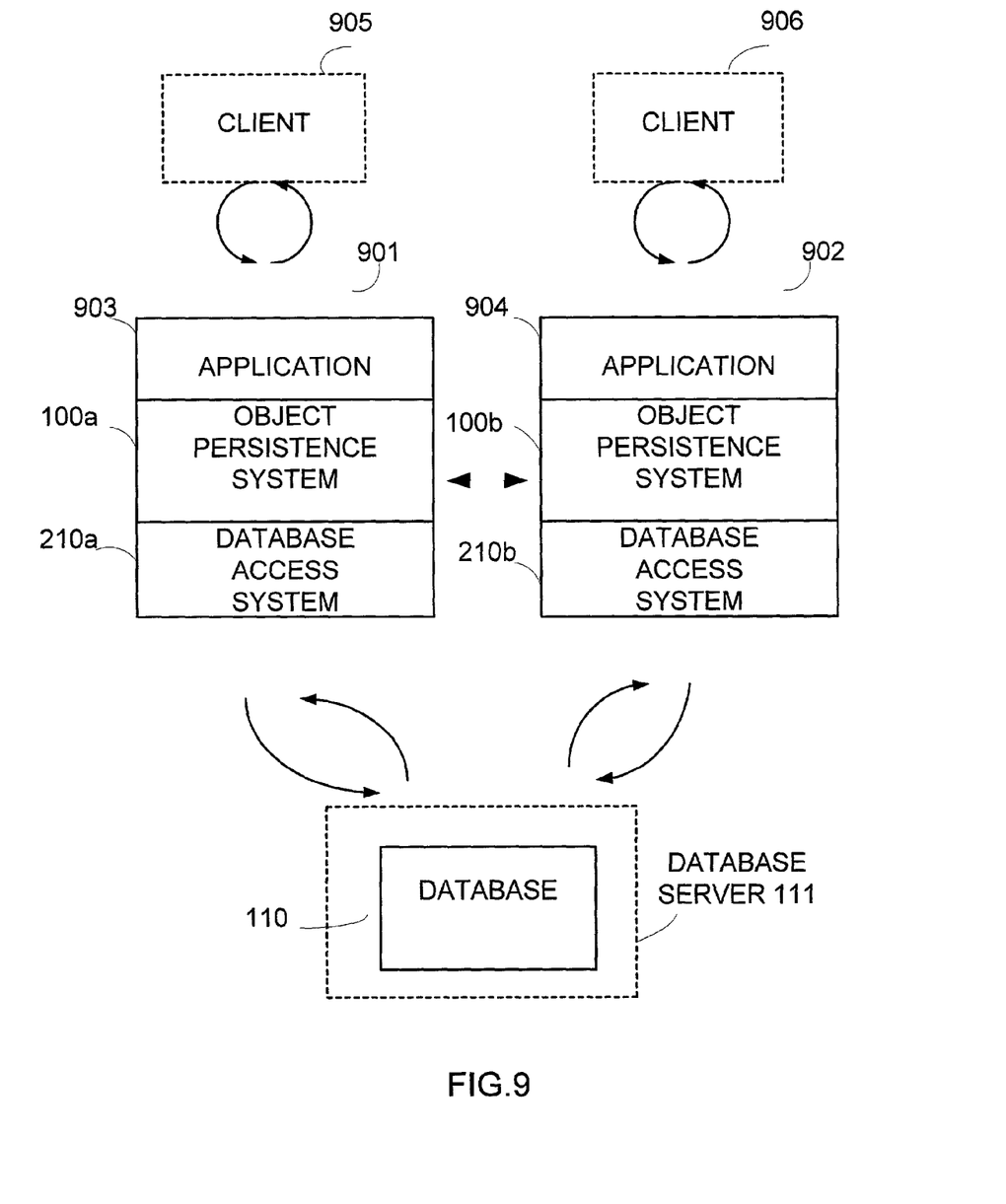
FIG. 9 is a block diagram showing an example of an application server to which the object persistence system 100 is applied.

FIG. 9 shows an example of application servers to which the object persistence system 100 is applied. In FIG. 9, the object persistence system 100 is implemented using a 3-tier architecture. The application servers 901 and 902 can couple to one or more databases. In FIG. 9, one database 110 and one database server 111 are represented for simplicity. One of ordinary skill in the art can readily apply the concepts described herein to multiple databases. Application servers 901 and 902 provide services to clients 905 and 906 in response to clients' requests, such as read requests and modification requests.

The application server 901 includes an object persistence system 100a, a database access system 210a and an application 903. The application 903 may access the object persistence system 100a.

The application server 902 includes an object persistence system 100b, a database access system 210b and an application 904. The application 904 may access the object persistence system 100b.

Each object persistence system 100a, 100b may be similar to the object persistence system 100.

The database access system 210a is a programming interface that enables the object persistence system 100a to access the database server 111. The database access system 210b is a programming interface that enables the object persistence system 100b to access the database server 111. Each database access system 210a, 210b may be similar to the database access system 210.

The object persistence systems 100a and 100b are connected through a communication mechanism/system (not shown), such as Remote Method Invocation (RMI), Common Object Request Broker Architecture (CORBA), SessionBeans, and multicast sockets, which enable the object persistence systems 100 to establish a communication link between each other, though any other communication mechanism may be used such that communication may be effected between object persistence systems.

For example, the object change sets of the local application server 901 are distributed through a communication mechanism or network protocol to the application server 902 that maintains an in-memory object cache. Each object persistence system 100a, 100b integrates and supports persistence in the application servers. The object persistence systems 100a and 100b allow applications 903 and 904, respectively, to transparently store and retrieve objects using the databases.

Figure 10:
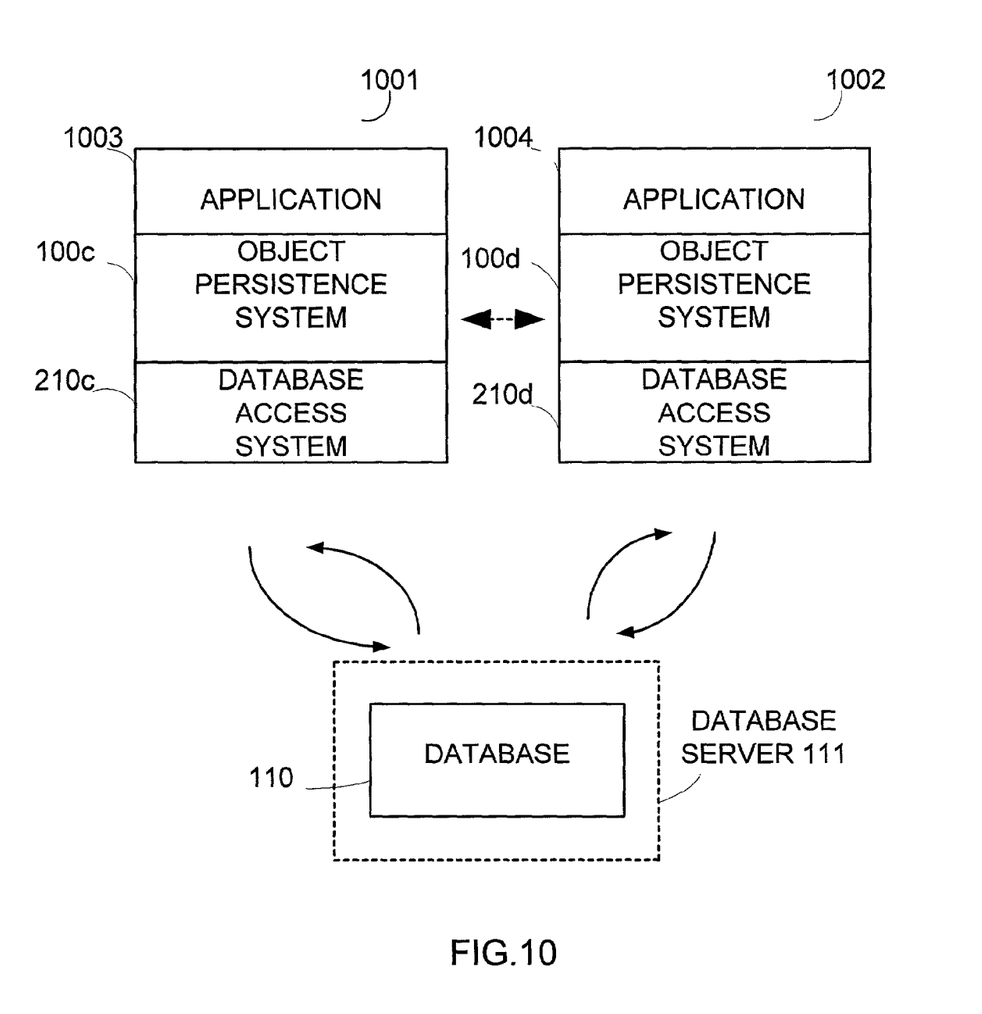
FIG. 10 is a block diagram showing an example of a database client to which the object persistence system 100 is applied.

FIG. 10 shows another example of database clients to which the object persistence system 100 is applied. In FIG. 10, the object persistence system 100 is implemented using a 2-tier architecture. Clients 1001 and 1002 can couple to one or more databases. In FIG. 10, one database 110 and one database server 111 are represented for simplicity. One of ordinary skill in the art would readily apply the concepts described herein to multiple databases. Clients 1001 and 1002 generate requests and transmit them to the database server 111. The database client 1001 includes the object persistence system 100c, a database access system 210c and an application 1003. The database client 1002 includes the object persistence system 100d, a database access system 210d and an application 1004.

Each object persistence system 100c, 100d may be similar to the object persistence system 100.

The database access system 210c is a programming interface that enables the object persistence system 100c to access the database server 111. The database access system 210d is a programming interface that enables the object persistence system 100d to access the database server 111. Each database access system 210c,210d may be similar to the database access system 210.

The applications 1003 and 1004 may access the object persistence systems 100c and 100d, respectively.

The object persistence systems 100s and 100d are connected through a communication mechanism/system (not shown), which enables the object persistence systems 100c and 100d to establish a communication link between each other.

For example, the object change sets of the local database client 1001 are distributed through a communication mechanism or network protocol to the database client 1002 that maintains in-memory object cache(s).

Each object persistence system 100c, 100d integrates and supports persistence in database clients. The object persistence systems 100c and 100d allow applications 403 and 404, respectively, to transparently store and retrieve objects using the databases. According to the present invention, the object persistence system can manage the set of objects dynamically.

Further, connections between the object persistence systems can be managed when one or more on-line object persistence systems shutdown and startup.

Referring back to FIG. 1, consider that the object persistence systems 100-102 come on-line and the object persistence system 101 shuts down. Then, object persistence system 101 will be removed from the group. However, when the object persistence system 101 starts up, the object persistence system 101 will be added to the group through the same bi-directional mechanism as described above.

The synchronization executor of the present invention may be implemented by any hardware, software or a combination of hardware and software having the above described functions. The software code, either in its entirety or a part thereof, may be stored in a computer readable memory. Further, a computer data signal representing the software code which may be embedded in a carrier wave may be transmitted via a communication network. Such a computer readable memory and a computer data signal are also within the scope of the present invention, as well as the hardware, software and the combination thereof. While particular embodiments of the present invention have been shown and described, changes and modifications may be made to such embodiments without departing from the true scope of the invention.

What is claimed is:

1. A method for providing object change information from a first system to one or more systems for synchronizing the one or more systems with the first system, the one or more systems having one or more object caches for storing objects, the method comprising the steps of:

during a transaction, storing a set of changes to an object into a transaction cache of the first system;

computing an object change set, when the transaction is committed, representing the set of changes to the object;

translating the object change set into a database language;

sending the translated object change set to a central database system for update; and permanently committing the set of changes to an in-memory object cache if the central database system reports no error when updating the objects;

wherein permanently committing the set of changes includes distributing the object change information directly from the first system to one or more systems to cause the one or more systems to merge the object change information into the one or more object caches so as to synchronize the one or more systems with the first system;

wherein the objects are included in a remote database system; and wherein one or more of the first system and the one or more systems can perform database operations on a given object within the database.

2. The method as claimed in claim 1 further comprising a step of establishing a communication link between the first system and the one or more systems wherein the distributing step distributes the object change information from the first system to the one or more systems through the communication link.

3. The method as claimed in claim 2 wherein the establishing step establishes the communication link based on a publish/subscribe protocol.

4. The method as claimed in claim 1 further comprising a step of registering the one or more systems in the first system prior to the distributing step wherein the distributing step distributes the object change information to the registered one or more systems.

5. The method as claimed in claim 1 further comprising a step of sending the object change information to the database for updating the object in the database with the object change information.

6. The method as claimed in claim 5 further comprising the steps of:

receiving an error message from the database when the updating of the object in the database fails; and discarding the object change information prior to the distributing step in response to the error message.

7. The method as claimed in claim 1 wherein the first system includes an object cache for storing one or more objects, and the method further comprises a step of merging the object change information into the object cache of the first system.

8. The method as claimed in claim 1 wherein the determining step determines the object change information as a minimal set of information representing the change made to the object.

9. The method as claimed in claim 1 wherein the determining step determines the object change information to include a primary key identifying the object and any changed attribute of the object.

10. The method as claimed in claim 1 wherein the object includes an attribute for containing object data or a value of a relationship with one, or more, other object, and the determining step determines the object change information to include a change made in the attribute of the object.

11. The method as claimed in claim 1 wherein the first system includes a cache for storing one or more objects, the method further comprising the steps of:

receiving object change information distributed from the one or more systems and containing information of changes made to one or more objects in the one or more systems; and merging the object change information received from the one or more systems into the objects in the cache of the first system to synchronize the first system with the one or more systems.

12. Computer readable media storing instructions executed by a computer to perform a method for providing object change information from a first system to one or more systems for synchronizing the one or more systems with the first system, the one or more systems having one or more object caches for storing objects, the method comprising the steps of:

during a transaction, storing a set of changes to an object into a transaction cache of the first system;

computing an object change set, when the transaction is committed, representing the set of changes to the object;

translating the object change set into a database language;

sending the translated object change set to a central database system for update; and permanently committing the set of changes to an in-memory object cache if the central database system reports no error when updating the objects;

wherein permanently committing the set of changes includes distributing the object change information directly from the first system to the one or more systems to cause the one or more systems to merge the object change information into the one or more object caches so as to synchronize the one or more systems with the first system wherein the objects are included in a remote database system; and wherein one or more of the first system and the one or more systems can perform database operations on a given object within the database.

* * * * *